US011345414B1

(12) United States Patent
Eaton

(10) Patent No.: US 11,345,414 B1
(45) Date of Patent: May 31, 2022

(54) VEHICLE ACCESSORY CLAMP

(71) Applicant: Super ATV, LLC, Madison, IN (US)

(72) Inventor: Justin L. Eaton, Hanover, IN (US)

(73) Assignee: Super ATV, LLC, Madison, IN (US)

( * ) Notice: Subject to any disclaimer, the term of this patent is extended or adjusted under 35 U.S.C. 154(b) by 0 days.

(21) Appl. No.: 17/455,948

(22) Filed: Nov. 22, 2021

(51) Int. Cl.
*B62D 27/06* (2006.01)
*B60J 1/00* (2006.01)
*F16B 2/06* (2006.01)
*B60R 21/13* (2006.01)
*B60R 11/00* (2006.01)

(52) U.S. Cl.
CPC .............. *B62D 27/06* (2013.01); *B60J 1/006* (2013.01); *B60R 21/13* (2013.01); *B60R 2011/0071* (2013.01); *F16B 2/065* (2013.01)

(58) Field of Classification Search
CPC .......... B62D 27/06; B60J 1/006; B60R 21/13; B60R 2011/0071; F16B 2/065
USPC ......................................................... 296/29
See application file for complete search history.

(56) References Cited

U.S. PATENT DOCUMENTS

| 6,585,212 | B2* | 7/2003 | Carnevali | B60R 11/0252 |
| | | | | 312/319.1 |
| 8,414,067 | B2* | 4/2013 | Howard | B62D 33/046 |
| | | | | 403/205 |
| 10,914,556 | B2* | 2/2021 | Stewart | B62D 27/065 |
| 11,148,733 | B2* | 10/2021 | Mar | B62D 25/08 |
| 2021/0323494 | A1* | 10/2021 | Terbu | B60R 21/207 |

* cited by examiner

*Primary Examiner* — Pinel E Romain
(74) *Attorney, Agent, or Firm* — Woodard, Emhardt, Henry, Reeves & Wagner, LLP

(57) ABSTRACT

An accessory clamp for an off-road vehicle includes a pair of cooperating clamp members. The first clamp member has an engaging edge with a tongue adapted to be received into a groove, and the second clamp member has an engaging edge with a groove adapted to receive the tongue of the first clamp member. The tongue-in-groove connection allows the second clamp member to securely grip the first clamp member when the two members are secured together, thus providing an interlocked connection between the first- and second clamping members. A threaded connector secures the second clamp member to the first clamp member in a locked, secure connection. The engaging edge of the second clamp member may be adapted to rotate about the engaging edge of the first clamp member, thus providing a locked and secure hinged connection between the first- and second clamping members along their respective engaging sides.

17 Claims, 7 Drawing Sheets

VEHICLE ACCESSORY CLAMP

FIELD OF THE INVENTION

The present invention relates generally to off-road vehicles, and more particularly to accessories for off-road vehicles such as all-terrain (ATV) vehicles and utility task (UTV) vehicles.

BACKGROUND TO THE INVENTION

Off road vehicles typically have a roll cage to protect the occupants from injury if the event of a rollover. In some cases, the cage may support accessories such as windshields and/or roofs. When such accessories are desired, a clamp may be used to mount the accessory to the cage.

However, in some situations the configuration of the cage and its desired accessory may make the use of clamps difficult or even impossible. The gap available for the clamp may be insufficient to allow the clamp to be installed, and/or the clamp may not provide structures necessary to mount the accessory to the clamp in tight conditions.

A need therefore exists for a clamp effective to mount vehicle accessories to the cage of an off-road vehicle, particularly when tight spaces are encountered. The present invention address that need.

SUMMARY OF THE INVENTION

In one preferred aspect of the present invention there is provided an accessory clamp for an off-road vehicle. The accessory clamp includes a pair of cooperating clamp members, with the first clamp member having an engaging edge with a tongue adapted to be received into a groove, and the second clamp member having an engaging edge with a groove adapted to receive the tongue of the first clamp member. The tongue-in-groove connection allows the second clamp member to securely grip the first clamp member when the two members are secured together, thus providing an interlocked connection between the first- and second clamping members. A threaded connector secures the second clamp member to the first clamp member in a locked, secure connection.

The engaging edge of the second clamp member may be adapted to rotate about the engaging edge of the first clamp member, thus providing a locked and secure, yet selectable, hinged connection between the first- and second clamping members along their respective engaging sides.

Securing the two clamp members together simultaneously secures the clamp to a vehicle cage member positioned between the first- and second clamp members.

WRITTEN DESCRIPTION

Figure 1:
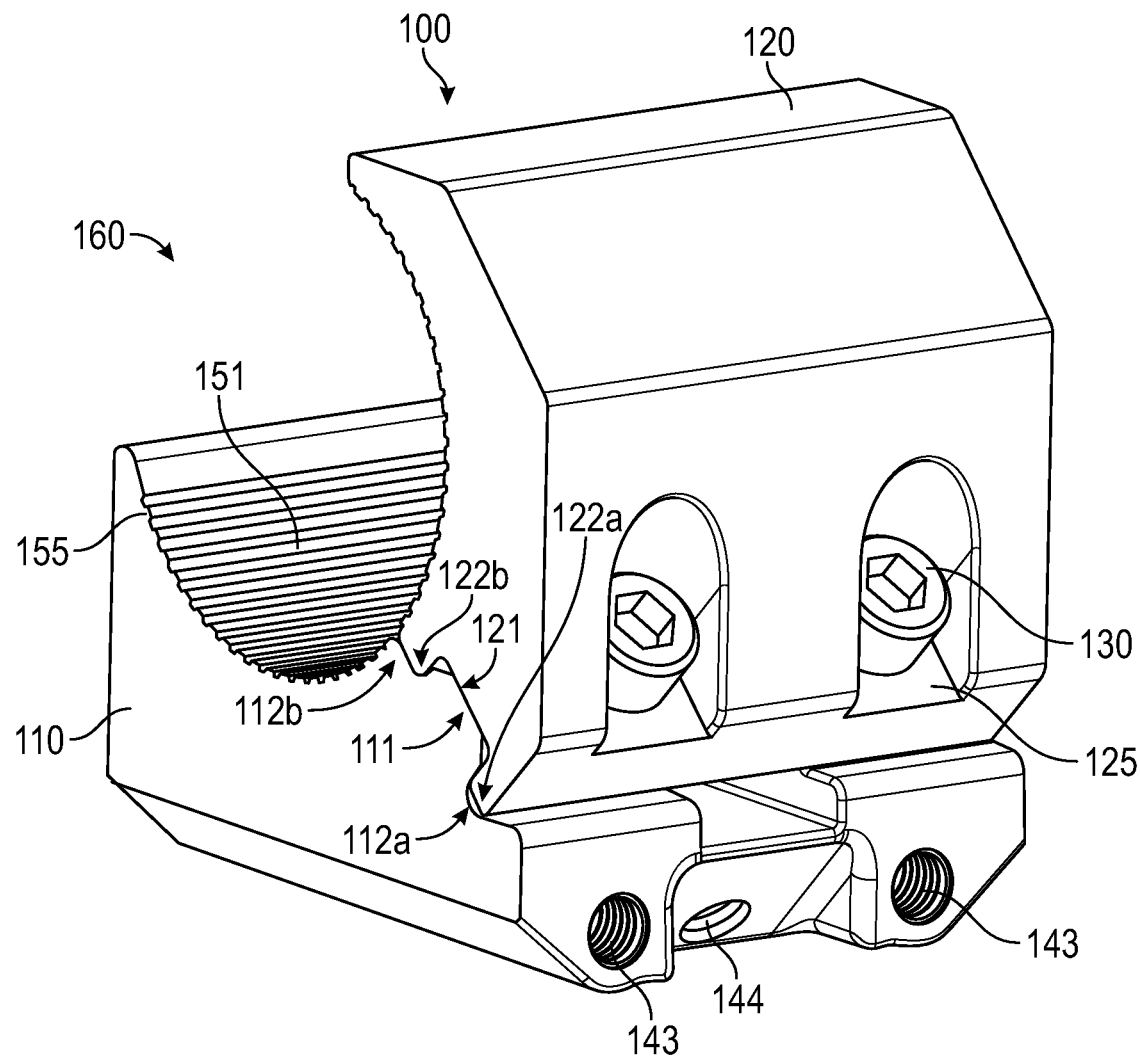
FIG. 1 shows a perspective view of one embodiment of the present invention.

For the purposes of promoting an understanding of the principles of the invention, reference will now be made to certain embodiments and specific language will be used to describe the same. It will nevertheless be understood that no limitation of the scope of the invention is thereby intended, such alterations and further modifications in the described device, and such further applications of the principles of the invention as illustrated therein, being contemplated as would normally occur to one skilled in the art to which the invention relates.

As indicated above, one aspect of the present invention relates to an accessory clamp for an off-road vehicle. The accessory clamp may comprise:

a) a first clamp member with a first gripping surface and a clamp-engaging edge comprising a tongue adapted to be received into a groove;

b) a second clamp member with a second gripping surface and a clamp-engaging edge comprising a groove adapted to receive the tongue of the first clamp member in a manner effective to allow the engaging edge of the second clamp member to securely grip the engaging edge of the first clamp member when the two members are secured together, thus providing an interlocked connection between the first- and second clamping members when their respective tongue and groove engaging edges are secured together;

c) at least one threaded connector adapted to secure the second clamp member to the first clamp member in a locked, secure connection, and thus to secure the clamp to a vehicle roll cage member (cage member) positioned between the first- and second gripping surfaces;

wherein at least one of the two clamp members further includes at least one threaded opening adapted to receive a threaded connector of a vehicle accessory.

In one preferred embodiment the first and second gripping surfaces, when joined together, have a cross-sectional shape that corresponds to the cross-sectional shape of a vehicle cage member to be clamped by the clamp. Additionally or alternatively, the gripping surface of one or both clamp members may be provided with ribs, or protrusions, or other surface features that allow the clamp member to grip a vehicle cage member with more strength that would be obtained with a smooth surface, and particularly to resist rotation of the clamp about the cage member.

In some preferred embodiments the engaging edges of the two clamp members are adapted to allow the engaging edge of the second clamp member to rotate slightly about the engaging edge of the first clamp member. In this embodiment, the two clamp members may be locked in a fixed position that is selected from the positions that are available as the engaging edge of the second clamp member is rotated about the engaging edge of the first clamp member. As the groove of the second clamp member is rotated around the tongue of the first clamp member, the threaded connector(s) are tightened when the desired position is obtained, thus securing the two clamp members together in a fixed, selected position, while simultaneously securing the clamp to a vehicle cage member positioned between the first- and second gripping surfaces. In some embodiments the two engaging edges are adapted to allow 1° to 5° of rotation, although in other embodiments a greater amount of rotation may be allowed.

The tongue-in-groove construction of the two engaging edges allows the two clamp members to be locked in a fixed position that more strongly resists movement. The shape of the tongue portion of the first clamp member may be rounded, or rectangular, or rectangular with radiused edges, or rectangular with angled edges, or some other shape altogether. Similarly, the size and shape of the groove may match the size and shape of the tongue exactly, or it may allow some movement of the tongue in the groove when the two pieces are not locked together.

One or both of the two clamp members includes at least one threaded opening adapted to receive a threaded connector of a vehicle accessory. The size, positioning, and orientation of the threaded openings is selected to accommodate a threaded fastener for any desired accessory. Further, unthreaded openings may be used instead of or in addition to the threaded openings to facilitate attachment of an accessory to the clamp, and thus to a vehicle.

To use the accessory clamp, the two clamp members may be loosely connected by the threaded connector(s) before the clamp is positioned on a vehicle roll cage member (cage member). After proper positioning on the cage member, the threaded connector(s) are tightened. This locks the two clamp members together in a fixed and locked position, while simultaneously securing the clamp to the vehicle cage member positioned between the first- and second gripping surfaces. Accessories, such as a windshield, or a roof, or both, may then be connected to the clamp using the provided threaded connection holes. Alternatively, one or more accessories may be attached to the clamp before the clamp is mounted to the vehicle cage. The asymmetrical, open-sided shape of the clamp makes it possible to mount accessories such as windshields and/or roofs without disturbing seals that engage the cage or the accessory to which the clamp is attached.

Further, in some embodiments the gripping surface of the clamp may be provided with a protective surface that prevents damage to the vehicle member's finish. This nonmarring feature may be applied as a coating, or as a separate rubber or plastic liner, or with a liner that is mated to the clamp half.

Also, although the clamp has been described herein as being mounted and tightened using threaded or unthreaded fasteners generally, it is to be appreciated that a quick-release embodiment may be provided to allow the clamp to be mounted and tightened without using any tools.

Referring now to the drawings, FIGS. 1-31 show various embodiments and/or features of accessory clamp of the present invention.

FIG. 1 shows a perspective view of one embodiment of the present invention. Clamp 100 includes first clamp member 110, with a first gripping surface 151 and an engaging edge comprising a tongue 111 adapted to be received into a groove. Second clamp member 120 has a gripping surface and an engaging edge comprising a groove 121 adapted to receive tongue 111 of first clamp member 110 in a manner effective to allow the engaging edge of the second clamp member to rotate about the engaging edge of the first clamp member, thus providing a movable, hinged connection between the first- and second clamping members along their respective engaging edges. Shoulders 112a and 112b, and 122a and 122b, may limit the amount of rotation.

Threaded connectors 130 are provided in slots 125 to secure second clamp member 120 to first clamp member 110 in a fixed, selected position as the groove of the second clamp member is rotated around the tongue of the first clamp member. This secures the two clamp members together in a fixed, selected position, and simultaneously secures the clamp to a vehicle cage member positioned between the first- and second gripping surfaces.

Threaded openings 143 and 144 are adapted to receive a threaded connector of a vehicle accessory.

Ribs 155 give greater purchase to gripping surface 151.

The two clamp members are adapted to leave an opening 160 between their distal ends, thus allowing the clamp to be used in tight spaces.

Figure 2:
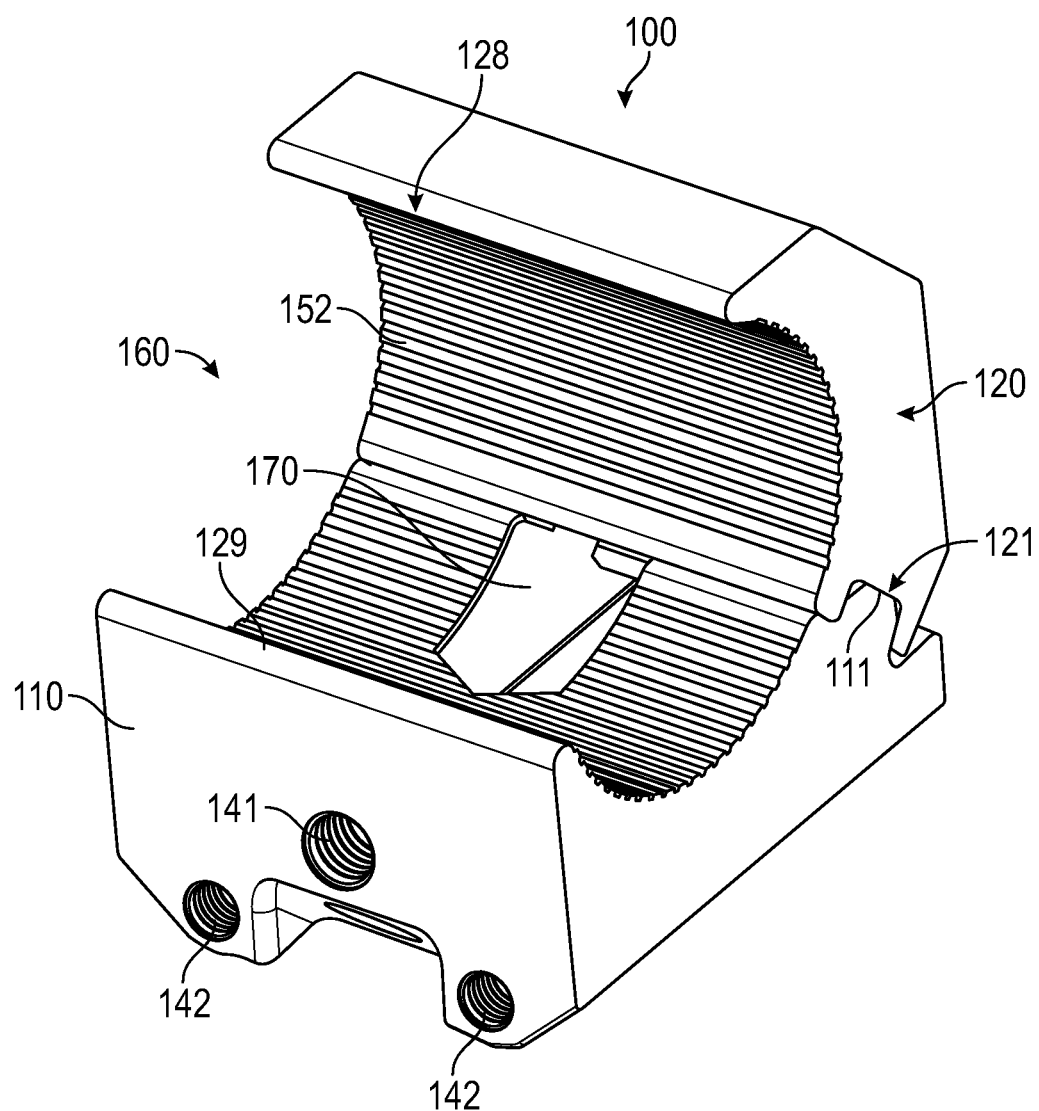
FIG. 2 shows another perspective view of the embodiment of FIG. 1.

FIG. 2 shows another perspective view of the embodiment of FIG. 1. Clamp 100 includes first clamp member 110, with a first gripping surface and an engaging edge comprising a tongue 111 adapted to be received into a groove. Second clamp member 120 has a second gripping surface 152 and an engaging edge comprising a groove 121 adapted to receive tongue 111 of first clamp member 110 in a manner effective to allow the engaging edge of the second clamp member to rotate about the engaging edge of the first clamp member, thus providing a movable, hinged connection between the first- and second clamping members along their respective engaging edges. Threaded connectors secure second clamp member 120 to first clamp member 110 in a fixed, selected position as the groove of the second clamp member is rotated around the tongue of the first clamp member. This secures the two clamp members together in a fixed, selected position, and simultaneously secures the clamp to a vehicle cage member positioned between the first- and second gripping surfaces. Threaded openings 141 and 142 are adapted to receive a threaded connector of a vehicle accessory. Opening 170 allows access to the underside of the clamp.

The two clamp members are adapted to leave an opening 160 between their distal ends, thus allowing the clamp to be used in tight spaces. Further, and as can be seen from the drawings, the clamp is asymmetrical when used, thus improving its ability to be used in places such as roof or windshield attachments where it is desired to decrease or avoid air gaps between the accessory and the vehicle cage member.

Figure 3:
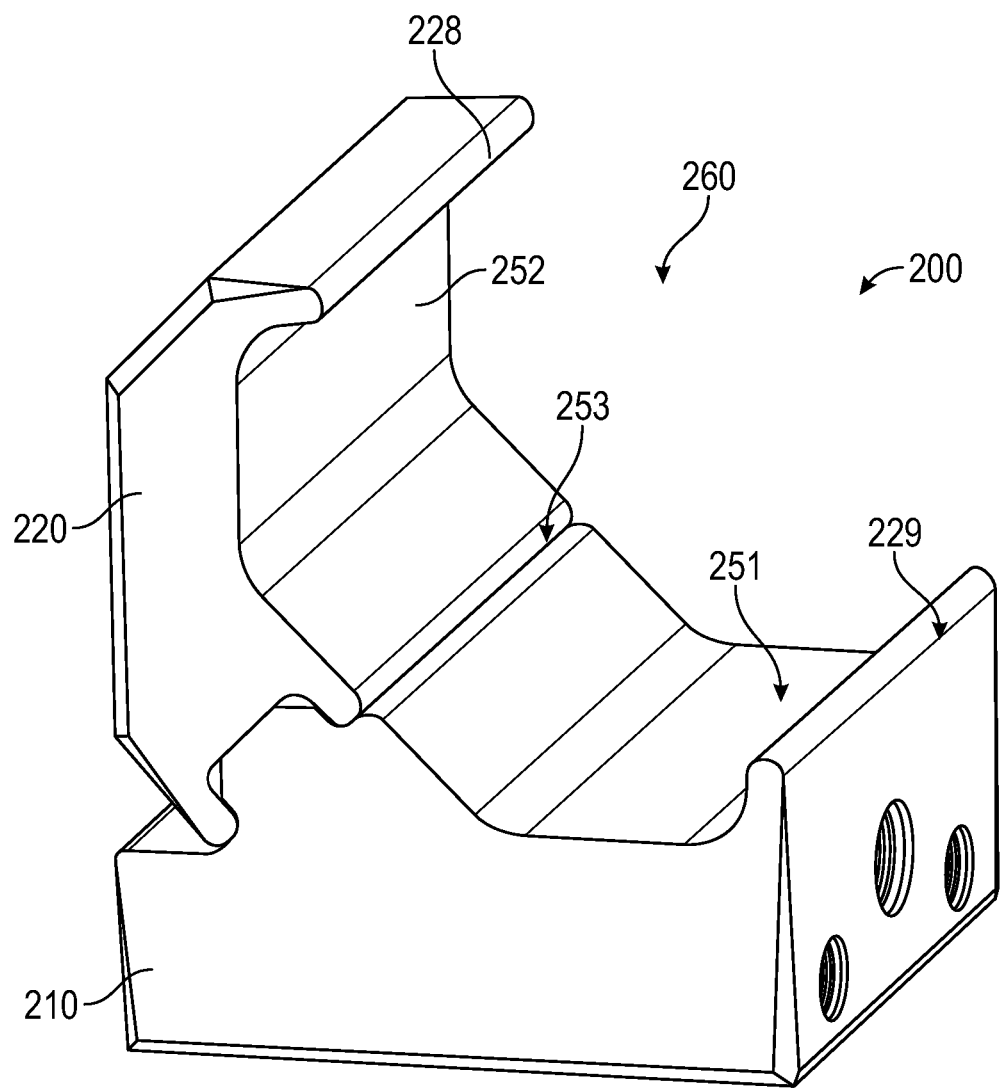
FIG. 3 shows a perspective view of another embodiment of the present invention.
Figure 4:
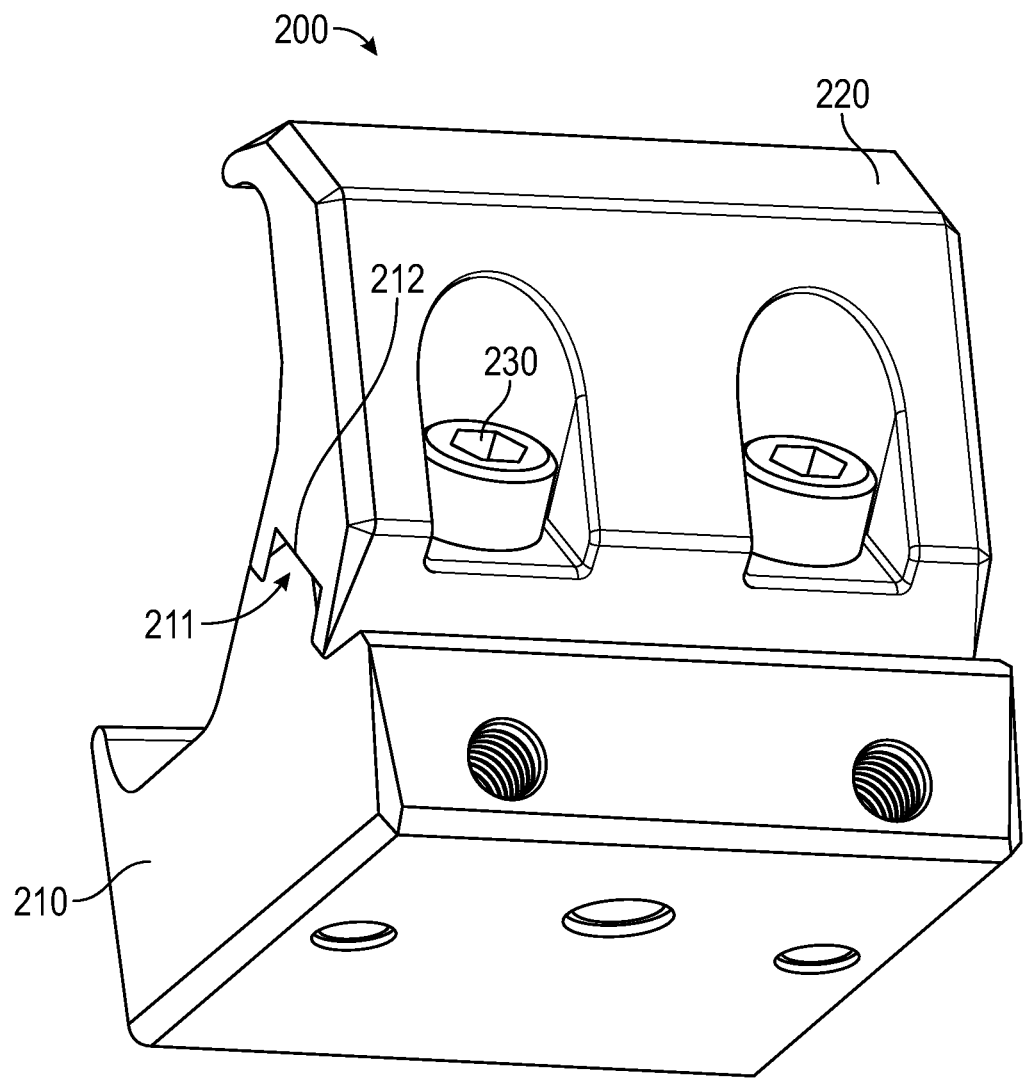
FIG. 4 shows another perspective view of the embodiment of FIG. 3.

FIGS. 3 and 4 show perspective views of another embodiment of the present invention. Clamp 200 includes first clamp member 210, with a first gripping surface 251 and an engaging edge comprising a tongue 211 adapted to be received into a groove. Second clamp member 220 has a gripping surface and an engaging edge comprising a groove 221 adapted to receive tongue 211 of first clamp member 210 in a manner effective to allow the engaging edge of the second clamp member to rotate about the engaging edge of the first clamp member, thus providing a movable, hinged connection between the first- and second clamping members along their respective engaging edges. Shoulders 212a and 212b, and 222a and 222b, may limit the amount of rotation.

Threaded connectors 230 are provided in slots 225 to secure second clamp member 220 to first clamp member 210 in a fixed, selected position as the groove of the second clamp member is rotated around the tongue of the first clamp member. This secures the two clamp members together in a fixed, selected position, and simultaneously secures the clamp to a vehicle cage member positioned between the first- and second gripping surfaces. Threaded openings 243 and 244 are adapted to receive a threaded connector of a vehicle accessory. The two clamp members are adapted to leave an opening 260 between their distal ends, thus allowing the clamp to be used in tight spaces.

In the illustrated embodiment of FIGS. 3 and 4, the clamp is asymmetrical when used, thus improving its ability to be used in places, such as roof or windshield attachments, where it is desired to decrease or avoid air gaps between the accessory and the vehicle cage member.

Figure 5:
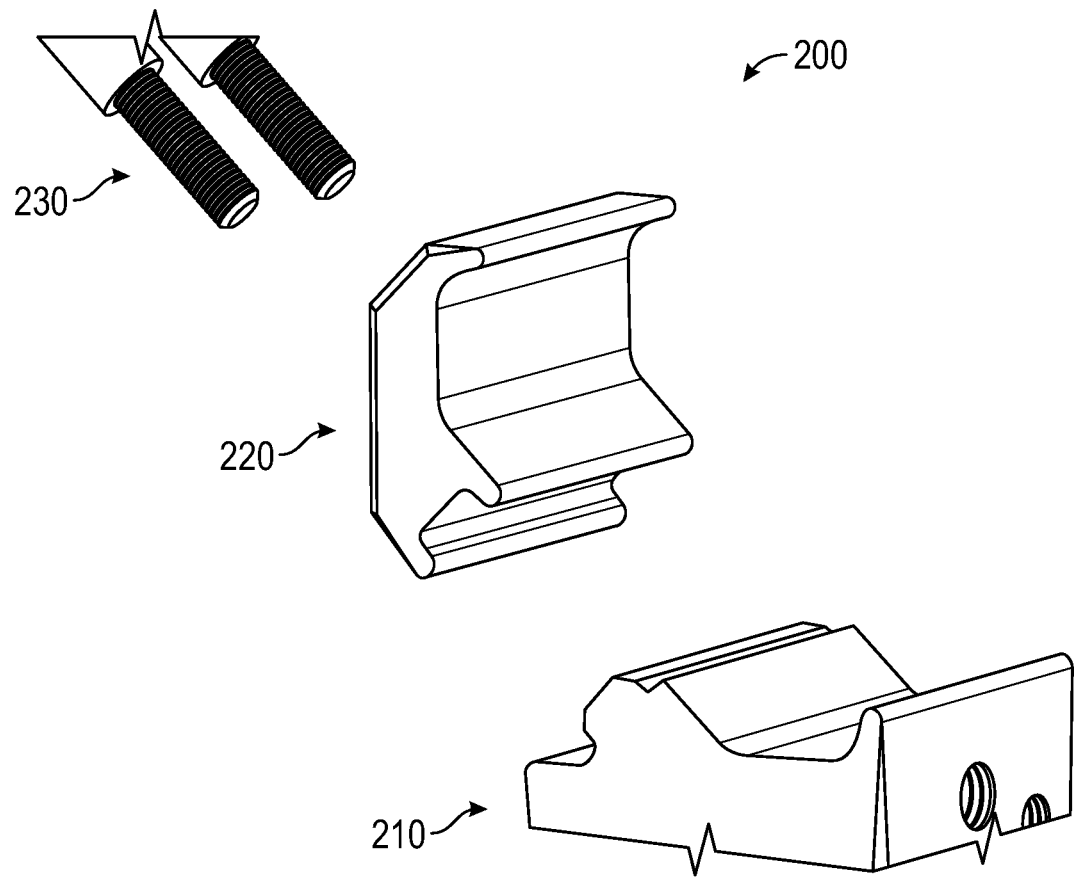
FIG. 5 shows an exploded perspective view of the embodiment of FIG. 3.
Figure 6:
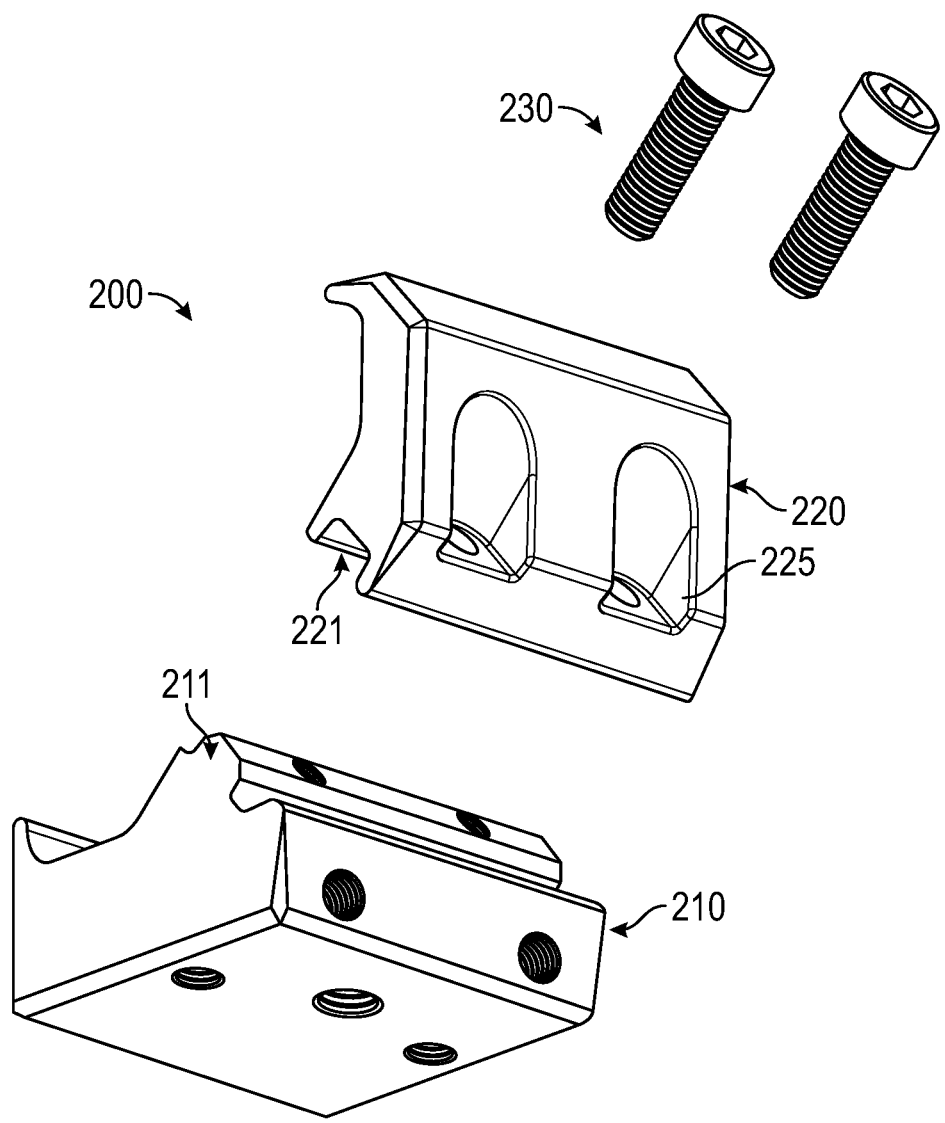
FIG. 6 shows another exploded perspective view of the embodiment of FIG. 3.
Figure 7:
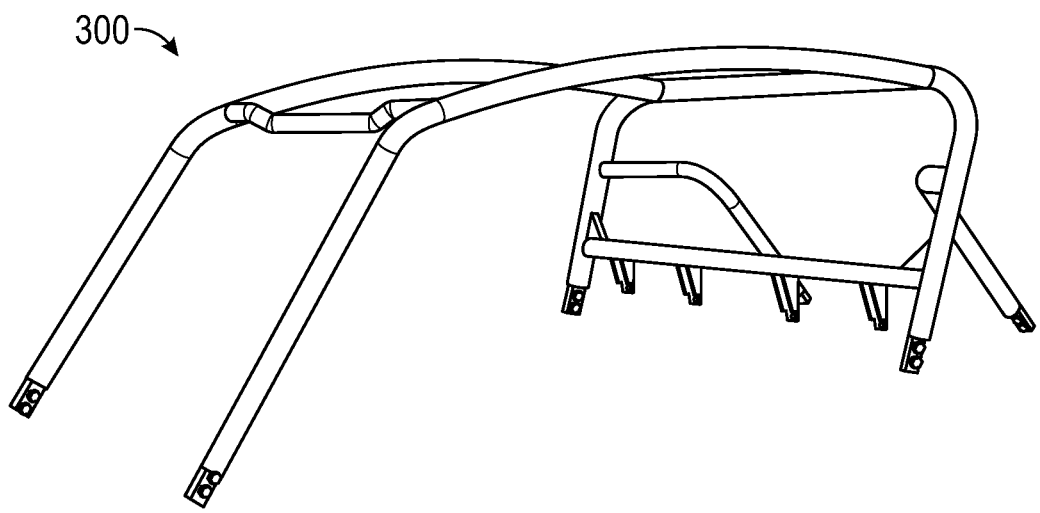
FIG. 7 shows a cage for an off-road vehicle, to which accessories such as a windshield and/or a roof may be attached.
Figure 8:
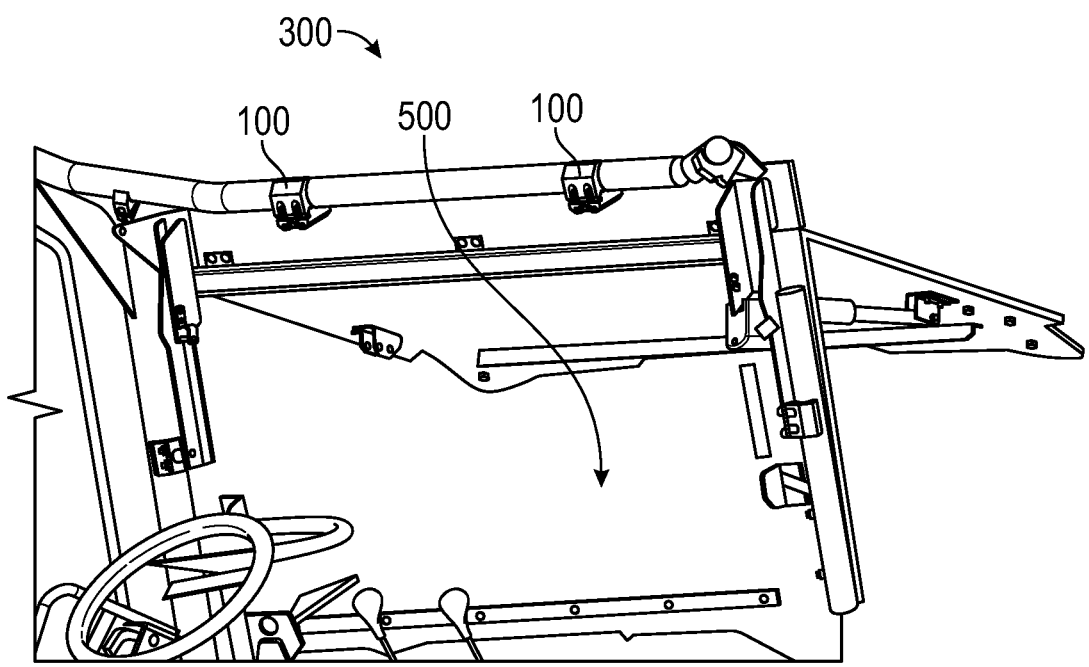
FIG. 8 shows one embodiment of the accessory clamp of the present invention mounted to an off-road vehicle.

FIGS. 5 and 6 show exploded perspective views of the embodiment of FIG. 3. Clamp 200 includes first clamp member 210 with an engaging edge comprising a tongue 211 adapted to be received into a groove. Second clamp member 220 has a groove 221 adapted to receive tongue 211 of first clamp member. Threaded connectors 230 are used to secure second clamp member 220 to first clamp member 210 in a fixed and locked position In another aspect of the present invention there is provided an assembly comprising a removable roof attached to an off-road vehicle roll cage (cage) using the inventive accessory clamps. FIG. 7 shows a cage 700 for an off-road vehicle, to which accessories such as a windshield and/or a roof may be attached. FIG. 8 shows one embodiment of that aspect of the invention, showing accessory clamp 100 being mounted to an off-road vehicle. In particular, clamps 100 are attached to vehicle cage member 300, and may be used to attach a roof (not shown) and a windshield 500 to the vehicle.

While the invention has been illustrated and described in detail in the drawings and foregoing description, the same are to be considered as illustrative and not restrictive, it being understood that only certain preferred embodiments have been shown and described and that all changes and modifications that come within the spirit of the invention are desired to be protected. In addition, it is to be appreciated that the present invention may comprise or consist essentially of any or all of the described or illustrated features. For example, the present invention includes devices and methods comprising any or all of the features described or illustrated in specification or drawings, and the present invention includes devices and methods consisting essentially of any or all of the features illustrated in the specification or drawings. Additionally, any or all of the features and/or embodiments disclosed herein may be combined with any or all of the other features and/or embodiments disclosed herein to provide a device or method that comprises or consists essentially of such features.

Finally, the grammatical device "and/or" (such as in "A and/or B") is used in this disclosure to mean A alone, or B alone, or both A and B.

The invention claimed is:

1. An accessory clamp for an off-road vehicle, comprising:
   a) a first clamp member with a first gripping surface and an engaging edge comprising a tongue adapted to be received into a groove;
   b) a second clamp member with a second gripping surface and an engaging edge comprising a groove adapted to receive the tongue of the first clamp member in a manner effective to allow the engaging edge of the second clamp member to rotate about the engaging edge of the first clamp member, thus providing a movable, hinged connection between the first- and second clamping members along their respective engaging edges;
   c) at least one connector adapted to secure the second clamp member to the first clamp member in a fixed, selected position as the groove of the second clamp member is rotated around the tongue of the first clamp member, thus securing the two clamp members together in a fixed, selected position and simultaneously securing the clamp to a vehicle cage member positioned between the first- and second gripping surfaces;
   wherein at least one of the two clamp members further includes at least one opening adapted to receive a connector to connect the clamp to a vehicle accessory.

2. An accessory clamp according to claim 1 wherein the first- and second gripping surfaces have a cross-sectional shape that corresponds to the cross-sectional shape of a vehicle cage member to be clamped by the clamp.

3. An accessory clamp according to claim 1 wherein the first- and second gripping surfaces include ribs adapted to better grip a vehicle cage member clamped by the clamp.

4. An accessory clamp according to claim 1 wherein the opening adapted to receive a connector is a threaded opening adapted to receive a threaded connector.

5. An accessory clamp according to claim 4 wherein the at least one connector adapted to secure the second clamp member to the first clamp member in a fixed, selected position is a threaded connector.

6. An accessory clamp according to claim 1 wherein the at least one connector adapted to secure the second clamp member to the first clamp member in a fixed, selected position is a quick-release connector.

7. An accessory clamp for an off-road vehicle, comprising:
   a) a first clamp member with a first gripping surface and an engaging edge comprising a tongue adapted to be received into a groove;
   b) a second clamp member with a second gripping surface and an engaging edge comprising a groove adapted to receive the tongue of the first clamp member in a manner effective to allow the engaging edge of the second clamp member to securely grip the engaging edge of the first clamp member when the two members are secured together, thus providing an interlocked connection between the first- and second clamping members when their respective tongue and groove sides are secured together;
   c) at least one connector adapted to secure the second clamp member to the first clamp member in a locked, secure connection, and thus to secure the clamp to a vehicle cage member positioned between the first- and second gripping surfaces;
   wherein at least one of the two clamp members further includes at least one opening adapted to receive a connector to connect the clamp to a vehicle accessory.

8. An accessory clamp according to claim 7 wherein the first- and second gripping surfaces have a cross-sectional shape that corresponds to the cross-sectional shape of a vehicle cage member to be clamped by the clamp.

9. An accessory clamp according to claim 7 wherein the first- and second gripping surfaces include ribs adapted to better grip a vehicle cage member clamped by the clamp.

10. An accessory clamp according to claim 7 wherein the engaging edge of the second clamp member is adapted to rotate about the engaging edge of the first clamp member, thus providing a locked and secure hinged connection between the first- and second clamping members along their respective engaging sides.

11. An accessory clamp according to claim 7 wherein the opening adapted to receive a connector is a threaded opening adapted to receive a threaded connector.

12. An accessory clamp according to claim 7 wherein the at least one connector adapted to secure the second clamp member to the first clamp member in a fixed, selected position is a threaded connector.

13. An accessory clamp according to claim 7 wherein the at least one connector adapted to secure the second clamp member to the first clamp member in a fixed, selected position is a quick-release connector.

14. An assembly comprising:
   a) an off-road vehicle having a roll cage;
   b) at least one vehicle accessory selected from the group consisting of a windshield and a roof, wherein the selected accessory is adapted to be removably attached to the roll cage;
   c) an accessory clamp for an off-road vehicle, comprising:
      i) a first clamp member with a first gripping surface and an engaging edge comprising a tongue adapted to be received into a groove;
      ii) a second clamp member with a second gripping surface and an engaging edge comprising a groove adapted to receive the tongue of the first clamp member in a manner effective to allow the engaging edge of the second clamp member to securely grip the engaging edge of the first clamp member when the two members are secured together, thus providing an interlocked connection between the first- and second clamping members when their respective tongue and groove sides are secured together;
      iii) at least one threaded connector adapted to secure the second clamp member to the first clamp member in a locked, secure connection, and thus to secure the clamp to a vehicle cage member positioned between the first- and second gripping surfaces;
   wherein at least one of the two clamp members further includes at least one opening adapted to receive a connector to connect the clamp to the selected accessory.

15. The assembly of claim 14 wherein the selected accessory comprises a windshield.

16. The assembly of claim 14 wherein the selected accessory comprises a roof.

17. The assembly of claim 14 wherein the clamp attaches to the vehicle and to the selected accessory without disturbing any seals that engage the cage or the accessory to which the clamp is attached.

* * * * *